United States Patent
Bugg

(10) Patent No.: US 12,522,981 B2
(45) Date of Patent: Jan. 13, 2026

(54) USE OF METAL CHELATES AS A SURFACE APPLICATION FOR ABRASION AND/OR TABER STIFFNESS, IMPROVEMENT IN PAPER AND PAPERBOARD

(71) Applicant: KEMIRA OYJ, Helsinki (FI)

(72) Inventor: George Gordon Bugg, Auburn, AL (US)

(73) Assignee: KEMIRA OYJ, Helsinki (FI)

( * ) Notice: Subject to any disclaimer, the term of this patent is extended or adjusted under 35 U.S.C. 154(b) by 538 days.

(21) Appl. No.: 17/599,798

(22) PCT Filed: Apr. 1, 2020

(86) PCT No.: PCT/US2020/026064
§ 371 (c)(1),
(2) Date: Sep. 29, 2021

(87) PCT Pub. No.: WO2020/205905
PCT Pub. Date: Oct. 8, 2020

(65) Prior Publication Data
US 2022/0145542 A1    May 12, 2022

Related U.S. Application Data

(60) Provisional application No. 62/828,021, filed on Apr. 2, 2019.

(30) Foreign Application Priority Data

May 29, 2019 (FI) .................................. 20195451

(51) Int. Cl.
*D21H 19/12* (2006.01)
*B32B 19/04* (2006.01)
(Continued)

(52) U.S. Cl.
CPC .......... *D21H 19/12* (2013.01); *B32B 19/046* (2013.01); *D21H 11/14* (2013.01); *D21H 27/22* (2013.01);
(Continued)

(58) Field of Classification Search
None
See application file for complete search history.

(56) References Cited

U.S. PATENT DOCUMENTS 3,740,253 A    6/1973 Hattori
4,063,976 A    12/1977 Wain et al.
(Continued)

FOREIGN PATENT DOCUMENTS

CN    102383338 A    3/2012
EP       0562821 B1   11/1995
(Continued)

OTHER PUBLICATIONS

International Search Report and Written Opinion mailed Jun. 15, 2020 in PCT/US2020/026064 (10 pages).
(Continued)

*Primary Examiner* — Alexander M Weddle
(74) *Attorney, Agent, or Firm* — Meunier Carlin & Curfman LLC

(57) ABSTRACT

The embodiments of the present invention generally relate to i) paper and paperboard or molded products with improved abrasion resistance and/or taber stiffness, ii) methods for making paper and paperboard or molded products with improved abrasion resistance and/or taber stiffness, and iii) methods for improving abrasion resistance and/or taber stiffness paper and paperboard or molded products, by using a metal chelate, such as, Ammonium Zirconium Carbonate (AZC) or Potassium Zirconium Carbonate (PZC). Further (Continued)

advantages of the embodiments of the present invention will be readily apparent to the reader from this disclosure.

11 Claims, 5 Drawing Sheets

(51) Int. Cl.
*D21H 11/14* (2006.01)
*D21H 27/22* (2006.01)

(52) U.S. Cl.
CPC ..... *B32B 2250/03* (2013.01); *B32B 2307/536* (2013.01); *B32B 2307/584* (2013.01)

(56) References Cited

U.S. PATENT DOCUMENTS

| | | | | |
|---|---|---|---|---|
| 5,169,497 A * | 12/1992 | Sarkar | ................. | D21H 17/005 |
| | | | | 162/168.3 |
| 5,268,030 A | 12/1993 | Floyd et al. | | |
| 6,994,771 B1 * | 2/2006 | Korhonen | .............. | D21H 23/28 |
| | | | | 162/358.3 |
| 2010/0227074 A1 * | 9/2010 | Trouve | ................... | D21H 19/64 |
| | | | | 427/439 |
| 2011/0259537 A1 * | 10/2011 | Husband | ............... | D21C 9/007 |
| | | | | 162/26 |
| 2012/0015145 A1 * | 1/2012 | Depres | ..................... | B32B 5/02 |
| | | | | 428/221 |

FOREIGN PATENT DOCUMENTS

| | | | | |
|---|---|---|---|---|
| EP | 2139815 A1 | 1/2010 | | |
| EP | 2432934 B1 | 9/2013 | | |
| JP | H01156597 A | 6/1989 | | |
| WO | WO-0134903 A1 * | 5/2001 | ............ | D04H 1/425 |
| WO | 2004025026 A1 | 3/2004 | | |
| WO | 2005042843 A1 | 5/2005 | | |
| WO | 2008116755 A1 | 10/2008 | | |
| WO | 2009010490 A2 | 1/2009 | | |
| WO | 2010133762 A1 | 11/2010 | | |
| WO | 2017220644 A1 | 12/2017 | | |
| WO | WO-2019063881 A1 * | 4/2019 | ............ | D21H 17/06 |

OTHER PUBLICATIONS

Finnish Patent Search Report mailed Jan. 29, 2020 in FI Patent Application No. 20195451 (2 pages).
English translation of the search report regarding corresponding Chinese application 2020800269632, dated on Oct. 25, 2022; 2 p.
J.P. Kezie Nov. 30, 1964, Chemical technology of Pulping and Papermaking (vol. II) Properties and Processing of Paper. Chinese Journal of Financial Economics Press; pp. 238-240.

* cited by examiner

10. Headbox
20. Machine wire
25. Spraying device e.g. Spray boom
30. Wet press section
40. Dryers
50. Size-press
60. Calendar stack
70. Water box
80. Coater (optional)
90. Reel
A. 15-35% (dry gram solid/total slurry weight)
B. 15-65% (dry gram solid/total slurry weight)
C. and D. 90-98% (dry gram solid/total slurry weight)

USE OF METAL CHELATES AS A SURFACE APPLICATION FOR ABRASION AND/OR TABER STIFFNESS, IMPROVEMENT IN PAPER AND PAPERBOARD

CROSS REFERENCE TO RELATED APPLICATIONS

This application is a United States National Phase Patent Application of International Patent Application Number PCT/US2020/026064, filed on Apr. 1, 2020, which claims the benefit of priority to U.S. Provisional Application No. 62/828,021, filed on Apr. 2, 2019, and Finnish National application No. 20195451, filed on May 29, 2019, the contents of which are incorporated by reference herein in their entireties.

FIELD OF THE INVENTION

This invention generally relates to i) paper and paperboard or molded products with improved abrasion resistance and/or taber stiffness, ii) methods for making paper and paperboard or molded products with improved abrasion resistance and/or taber stiffness, and iii) methods for improving abrasion resistance and/or taber stiffness paper and paperboard or molded products, by using a metal chelate, such as, Ammonium Zirconium Carbonate (AZC) or Potassium Zirconium Carbonate (PZC).

BACKGROUND OF THE INVENTION

Various chemicals and fiber treatment concepts have been developed in order to meet the specific taber stiffness (resistance to bending), abrasion resistance (rub resistance) and general strength requirements in paper-making processes. While some of the individual chemicals and fiber treatment concepts have proven to provide targeted paper-strength specifications, many of them perform well only when used for certain fiber stocks and/or under limited process conditions, and only satisfactorily, at best, or not at all for other fiber stocks or process conditions.

Some of the strength providing chemicals and fiber treatment concepts have also been found to negatively affect other aspects, such as harming the rate of dewatering on the machine wire (or forming fabric) or at the wet press section, causing deposits, disturbing charge related bonding of the fiber suspension etc.

Taber stiffness, as measured, is typically a function of the cross-section caliper of the board, the density and the type of fiber mix making up the sheet. Paper and paperboard producers "Mills" have caliper (thickness) and basis weight (e.g. mass of a given surface area, such as, # per 3300 ft2) specifications. The issue is that in order to meet taber stiffness and other specifications, the mills usually have no alternative but to add more fiber so as to create a) thicker or b) denser sheet to meet these specifications. However, adding more fiber is very costly, so any excess fiber that must be added (e.g. the mill term is "running heavy") is a pure loss to the mill. Having an alternative method of boosting taber stiffness, even by <10% of the current value, may save the mill from $12MM USD/year to $70MM USD/year depending on the type of paper (paper or paperboard) being produced.

On top of this, there is the consideration that the fiber saved can then be used to make additional tons of paper. The other aspect, abrasion resistance, is more difficult to quantify, and would be the result of looking at individual mill quality complaint volumes to determine the potential commercial value.

Due to the increased environmental awareness and regulations, papermaking processes have become more and more closed which means using less fresh water, resulting in increased conductivity or total ionic strength, i.e. salt concentration, in the fiber suspension. Concurrently, the recycle fiber content has increased as a fiber source in the papermaking process. The fibers obtained from the recycled fiber material may have undergone several rounds of recycling, which deteriorates the intrinsic strength of the fiber and general quality such as fiber length, thereby deteriorating end use properties of the paper, particularly the strength. Reduced intrinsic strength can increase the risk of paper web breakages, thereby negatively impacting productivity and overall process efficiency.

Hence, one common measure to compensate for strength loss, is to increase the refining level of the fiber material. The goal of increasing the refining is to develop fiber to fiber bonding by increasing the surface area of the fiber via cutting and fibrillation which increases the number of potential bonding sites (hydroxyl groups), thereby increasing the fibers' ability to create more hydrogen bonds with other cellulosic fibers and cellulosic fines and subsequently increasing the taber stiffness, abrasion resistance and overall strength of the paper. This operation (refining) results in a decrease in Canadian Standard Freeness (CSF), which is a common measure of pulp drainage. Lower CSF slows down the drainage rate which slows down the paper production rate, and the weak recycled fibers have a limited response to the additional refining. The fiber length of recycled fiber will decrease sharply after a limited amount of refining, resulting in a reduction of various strength properties.

In addition to low quality fibers, recycled fiber materials may introduce significant levels of detrimental substances to the papermaking process. This can include ash originating from coating pigments, starch, sizing agents, dissolved and colloidal substances. These substances carried over to the papermaking process may further increase the overall colloidal load and conductivity of the fiber suspension, accumulating in the process water circuit. These materials can cause plugging and deposits on the equipment and produced paper as well as interfere with fiber to fiber bonding.

Gypsum board, which is commonly known as drywall, is the technical product name used by manufacturers for a specific board with a primary gypsum core and a paper facing on each face. The facing papers are subjected to abrasion forces, both in wet and dry states, during manufacture, handling and installing of the gypsum boards. Even though the facing paper forms only minor part of the finished gypsum board, its defects, such as lack of abrasion resistance, are not just aesthetic inconveniences but may lead to rejection of the entire finished gypsum board. According to the U.S. Environmental Protection Agency, of the recycled gypsum boards, 64% are uninstalled gypsum boards coming from construction industry, 12% are rejects from gypsum board manufacture, and 24% waste from demolition and renovation. While the recycled gypsum has several re-use possibilities, e.g. as fertilizer, as soil amendment, in new gypsum boards, as an ingredient in cement, or as additive to compost, the recycled facing paper waste has fewer possibilities, such as use in agriculture, animal bedding or ceiling tiles. It would be highly desirable to reduce the amount of gypsum boards that are rejected during manufacture, handling or installing because of insufficient performance of the facing paper.

Previously abrasion resistance of gypsum board facing papers has been improved by incorporating small, hard abrasion resistant particles, i.e. "grit", to the paper, or to coating resin mixtures. This approach has the drawback of causing scratches and damage to the equipment e.g. rollers used during paper manufacture. Another approach has been to add strength additives to the fiber stock and/or on paper surface, as in US2005155731 which discloses addition of cationic dry- or wet-strength agent to fiber stock and anionic dry-strength agent to paper surface for improving abrasion resistance of gypsum board facing paper. Yet another approach is the incorporation of a lubricating agent in the paper making process. However, the need to apply multiple additives at different application points during the paper manufacture adds complexity of the process, and cost of the manufactured paper.

Zirconium chelates are known additives in paper manufacture, especially in the field of paper coating where they are used as insolubilizers in paper coating compositions containing starch, PVOH, latex or protein binders, aiming at higher coating integrity and quicker immobilization of the coating. According to Applicant's experience and expertise in the field of paper-making, and especially, in the production of paper with increased strength, and their general knowledge of the prior art, the published patent application US2012/0055642 entitled "Improving the Strength of Paper and Board Products" by Sinoco Chemicals Co, Finland, (Pub date 8 Mar. 2012) discusses, among other things, making hand-sheets with improved tensile strength. The patent claims to cover the entire range of anything called paper or paperboard, by applying water-insoluble polyvinyl alcohol (PVOH) fibers as one or more reinforcing layers, alone or as mixed with cellulose fibers, and then using zirconium in its standard role as an immobilizer, in order to help bond the PVOH-fibers to the structure.

Therefore, clearly in view of the discussed limitations in making a considerably stiffer paper, which is resistant to breakage, there is an unmet need for novel and innovative chemical solutions that can effectively increase the taber stiffness, abrasion resistance, and generally the strength of fibrous products including paper, that takes the aforementioned problems into consideration.

With the above in mind, this disclosure now provides surprising and novel solutions over the mentioned limitations, and over the existing prior art, and particularly, deals with issues faced thus far during the paper-making process.

SUMMARY OF THE INVENTION

According to a first aspect of the present invention, a method for improving abrasion resistance and/or stiffness of a fibrous product is disclosed, the method including providing an aqueous fiber stock, forming the fiber stock into a wet fibrous product, and drying the fibrous product, where at least one surface of the wet and/or dried fibrous product having a dryness of at least about 15% dry gram solid/total slurry weight, such as, about 15-65% gram solid/total slurry weight, or about 15%-35% gram solid/total slurry weight, or at least about 90% gram solid/total slurry weight, such as, about 90-98% gram solid/total slurry weight, is treated with a metal chelate solution.

According to some particular embodiments, a ready-made dried paper and/or a dried paperboard is treated with the metal chelate solution.

According to some particular embodiments, the metal chelate treated fibrous product has, advantageously, an abrasion resistance that is about 7.8% to 21.3% higher compared to an otherwise similar untreated control, as measured by Taber abrasion resistance test TAPPI T 476 om-11.

According to some particular embodiments the fibrous product is a paper or paperboard, and the at least one surface includes at least one side of the paper or the paperboard that is treated with the metal chelate solution.

According to some particular embodiments the fibrous product is a paper or paperboard, and the at least one surface includes both sides of the paper or the paperboard that are treated with the metal chelate solution.

According to some particular embodiments the metal chelate includes a zirconium chelate.

According to some particular embodiments the metal chelate includes an ammonium zirconium carbonate (AZC) and/or a potassium zirconium carbonate (PZC).

According to some particular embodiments the wet and/or dried fibrous product is treated with the metal chelate solution by applying an aqueous metal chelate solution by spraying, with a size-press, with a water-box, by padding, printing, foam application, roller application, impregnation on at least one surface of the fibrous product.

According to some particular embodiments, the fibrous product is selected from recycled board, solid bleached sulfate (SBS), unbleached kraft board, bleached or unbleached recycled paper, or bleached paper, or where the fibrous product is a molded fibrous product selected from egg carton, food service tray, beverage carrier, clamshell container, plate, bowl, or a mold for casting of concrete structures.

According to some particular embodiments, the amount of the aqueous metal-chelate solution applied on at least one surface of the fibrous product is in a range of about 0.05-2.0 lb solids/1000 square feet, preferably about 0.5-1.2 lb solids/1000 square feet.

According to some particular embodiments, the aqueous metal chelate solution has a metal chelate content of about 15% to about 20% based on weight of the metal chelate from the total weight of the aqueous solution.

According to some particular embodiments, the fiber stock includes recycled bleached and/or unbleached fibers and/or virgin fibers, preferably recycled fibers.

According to some particular embodiments, the recycled fibers originate from old corrugated containers, cardboard, mixed office waste, double liner kraft, and/or old newsprint.

According to some particular embodiments, the abrasion resistance and/or the stiffness are selectively improved in one or more areas of the fibrous product by selectively treating one or more areas of the fibrous product with the metal chelate.

According to some particular embodiments, the fiber stock is formed into two or more wet fibrous webs, where the wet webs being joined together obtaining a multilayered fibrous product, and the fibrous product is dried, where at least one of the surfaces of the wet fibrous webs being joined, is treated with the metal chelate.

According to some particular embodiments, the stiffness is characterized by being taber stiffness.

According to a second aspect of the present invention, a fibrous product, preferably a paper, a paperboard or a molded fibrous product is disclosed, with improved abrasion resistance and/or stiffness achieved by the above method.

According to some particular embodiments, the paper, or the paperboard has a grammage in a range of approximately 30 grams/square meter ($g/m^2$) to about 560 grams/square meter ($g/m^2$).

According to a third aspect of the present invention, a gypsum board, includes a gypsum board core, where on both sides thereof, a facing paper with improved abrasion resistance and/or stiffness is achieved by the above method.

According to a fourth aspect of the present invention, use of a metal chelate solution for improving abrasion resistance and/or stiffness of a fibrous product is disclosed, where at least one surface of the fibrous product having a dryness of at least about 15% dry gram solid/total slurry weight, such as, about 15-65% gram solid/total slurry weight, or about 15%-35% gram solid/total slurry weight, or at least about 90% gram solid/total slurry weight, such as, about 90-98% gram solid/total slurry weight, is treated with the metal chelate solution.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIG. 2A: No treatment; FIG. 2B: Water only treatment; and FIG. 2C: AZC (100%) treatment.

DETAILED DESCRIPTION OF THE INVENTION

Figure 1:
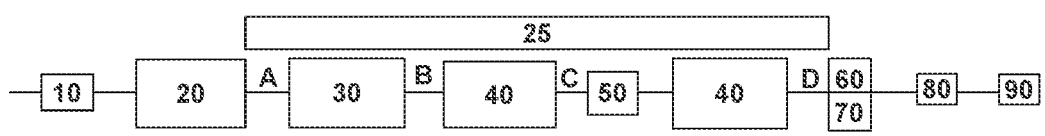
FIG. 1 shows a schematic diagram of an exemplary embodiment of the paper-making machine and the individual components of the paper-making machine in a paper-making process.

The various embodiments of the present invention are generally directed to paper and paperboard and molded fibrous products with abrasion resistance and/or taber stiffness, methods for making paper and paperboard and molded fibrous products with improved abrasion resistance and/or paper taber stiffness and methods for improving abrasion resistance and/or taber stiffness by using a metal chelate solution, which advantageously however, preferably uses Ammonium Zirconium Carbonate (AZC) or Potassium Zirconium Carbonate (PZC) as the active chemical compound.

The two chemical compounds Ammonium Zirconium Carbonate (AZC) and Potassium Zirconium Carbonate (PZC) have been used as coating insolubilizers for paper and paperboard coatings for decades according to Applicant's knowledge and expertise in the field of papermaking.

Without being bound by theory, the compounds are assumed to essentially work by crosslinking specific chemical groups, especially hydroxyl and carboxyl and amine groups in the coating. The thought behind this theory is that fiber to fiber bonding in paper/paperboard involves bonding of hydroxyl groups, so logically something that would enhance fiber to fiber bonding is also expected to strengthen the surface bonding of a paper/paperboard sheet or a molded fibrous product, making it more wear resistant (scuff or abrasion resistant) and, inferring the "I-beam effect". The stronger surface would also serve to make the sheet stiffer. This idea addresses, and hence, solves two technical issues seen in the industry one is (a) a need to improve the scuff or abrasion resistance of the paper/paperboard/fibrous product surface and two is (b) the desire to have a stiffer (e.g. more rigid, less prone to bend) sheet or shape without having to add extra fiber or machine processing.

Again without being bound by theory, the initially proposed mechanism is that metal chelate, especially zirconium chelate, enhances the fiber to fiber bonding at the surface (or however far it penetrates into the fibrous product, such as sheet) through forming bonds with —OH groups on the fiber, the same mechanism by which the zirconium forms bonds (crosslinks) the —OH and —COOH groups on starch and latex, respectively. The enhanced bonding gives greater abrasion resistance as the fibers will have less of a tendency to pull out of the surface and further disrupt the fiber matrix. On the stiffness aspect, the enhanced fiber to fiber bonding gives the surface of the fibrous product such as sheet (the zone of failure in the Taber stiffness test) more resistance to bending, as the fibers thereby interlock more strongly than in an untreated fibrous product such as sheet, providing a much higher yield strength.

During a typical papermaking process, a cellulosic fiber suspension having relatively high consistency, the so-called thick stock, is diluted with white water or other circulating waters into thin stock. As depicted and specifically shown in FIG. 1, typically, a fiber suspension (e.g. incoming stock depicted flow in FIG. 1), oftentimes has a consistency of at least above 20 g/l, which is called thick stock, before it is diluted with white water into thin stock.

Thin stock is then delivered from the wet end supply to a headbox (10) in the wet end of the paper-making machine. It is common practice to add various chemicals to the thin or thick stock prior to the stock being expelled from the headbox in order to achieve better processing properties and end-use properties. Once expelled from the headbox, the fiber-water suspension is drained on a moving screen, e.g. oftentimes referred to as a machine wire (20), forming a fiber mat which may also be referred to as a "ply" in a multi-layer (multi-ply) sheet. Optionally, the individual ply is combined with other plies being formed simultaneously by other forming equipment, typically headboxes (10) or vat formers. The wet web is then released from the forming section by going over a release roll generally referred to as the couch roll, and is then guided in to the press section where additional water is removed from the sheet via mechanical action (pressing), while still being processed in the wet web, and is then subsequently, dried in the dryer section by for example by steam heated dryer drums or in some cases by a Yankee dryer or by hot air, in order to form the dry sheet.

Between ⅓ and ⅔ of the way down the main section dryers, there is typically a device referred to as a size press (50) that is used to apply a surface treatment to one or both sides of the web, followed by additional drying. At the end of the main section dryers, many operations will have a dry or wet calender stack (60), which compresses and smooths the sheet. The dry sheet is then finally rolled up on a spool into what is called a reel (90) or log of paper or paperboard. Some systems may have additional equipment that applies one or more pigmented coatings to one or both sides of the sheet before the dry sheet is rolled up into the "log" or "reel" or product.

With specific reference to FIG. 1, in certain particular embodiments, an aqueous fiber stock is fed to a paper machine headbox (10) for forming a wet fiber web on machine wire (20), treating the fiber web having a dryness of at least 27% with a metal chelate by spraying an aqueous metal chelate solution on the fiber web with, for example, a spray boom (25), and then directing the treated fiber web to a wet press section (30) and thereafter to dryers (40), thereby obtaining a paper with improved abrasion resistance and/or taber stiffness.

With specific reference to FIG. 1, in certain particular embodiments, an aqueous fiber stock is fed to a paper machine headbox (10) for forming a wet fiber web on machine wire (20), directing the fiber web to a wet press section (30) and thereafter to dryers (40), treating the dried fiber web having a dryness of at least 15% with a metal chelate by applying an aqueous metal chelate solution with a size-press (50) on the fiber web, directing the treated fiber web to further dryers (40), thereby obtaining a paper with improved abrasion resistance and/or taber stiffness.

With specific reference to FIG. 1, in certain particular embodiments, an aqueous fiber stock is fed to a paper machine headbox (10) for forming a wet fiber web on machine wire (20), directing the fiber web to a wet press section (30) and thereafter to dryers (40), directing the dried fiber web to a calender stack (60) equipped with a water box (70) and treating the fiber web having a dryness of at least 90% with a metal chelate by applying an aqueous metal chelate solution with the water box (70) on the fiber web while calendering, thereby obtaining a paper with improved abrasion resistance and/or taber stiffness. An optional coater (80) may be placed between calender stack (60), water box (70) and the reel (90) as depicted in FIG. 1.

With specific reference to FIG. 1, in certain particular embodiments, the headbox (10) is a multilayer headbox capable of laying multiple layers of fibers on a machine wire.

With specific reference to FIG. 1, in certain particular embodiments, there is a headbox (10) for forming a wet fiber web on a machine wire (20), and at least one further headbox (10), for forming further fiber layers on the wet fiber web on the machine wire.

With specific reference to FIG. 1, in certain particular embodiments, there are multiple headboxes (10) forming wet fiber webs on multiple machine wires (20), followed by joining the multiple wet fiber webs into a multilayer wet fiber web before directing the fiber web to the press section (30). The metal chelate may be applied on one or more of the surfaces of the layers or webs being joined. In these embodiments especially taber stiffness is improved, and also ply bonding may be improved. When the metal chelate treatment is conducted not only between layers but also on one or more outer surfaces of the multilayered paper or paperboard, both taber stiffness and abrasion resistance may be improved.

The methods of the present disclosure are thus suitable for the manufacture of simple fiber webs of single ply and multiple ply fiber webs, such as, paper, paperboard and cardboard and gypsum board products with improved abrasion, and/or taber stiffness and resistance strength. Depending on the application, the number of fibrous substrates in a paper or paperboard product can vary. The paper product can have more than one fibrous layer.

In one embodiment, the paper product has two or more fibrous layers, e.g., a two-ply or multi-ply paper product. Each of the plies of a multi-ply product may have different properties and may be formed from cellulose fiber suspensions having different types and amounts of fiber.

The methods of the present disclosure may be used for manufacture of improved strength papers of various paper grades, such as, but not limited to, writing paper, printing paper, gypsum facing paper, single and multilayer paper and paperboard, copy paper, containing but not limited to recycled fiber consisting of mixed office waste, double liner kraft, old newsprint, or any such mixtures and combinations thereof, and virgin (freshly produced or non-recycled) fiber. In all cases the fiber may be bleached, unbleached, or a combination thereof.

The paper or paperboard may be any uncoated paper or paperboard including bleached or unbleached, virgin or recycled fibers. Examples of bleached paper include writing paper, printing paper, and copy paper. Examples of recycled board include gypsum facing paper, which is preferably multilayered.

Certain particular embodiments are directed to methods for improving the taber stiffness and the abrasion resistance of a paper, paperboard, or a molded fibrous product including egg cartons, cup holders or food trays is disclosed, where the method includes providing an aqueous fiber stock, forming the fiber stock into a wet fibrous product, and drying the fibrous product, where at least one surface of the wet and/or dried fibrous product having a dryness of at least about 15% dry gram solid/total slurry weight, such as, about 15-65% gram solid/total slurry weight, or about 15%-35% gram solid/total slurry weight, or at least about 90% gram solid/total slurry weight, such as, about 90-98% gram solid/total slurry weight, is treated with a metal chelate solution, which metal chelate solution, is characterized by having preferably the chemical compounds Ammonium Zirconium Carbonate (AZC) or Potassium Zirconium Carbonate (PZC).

Typically the AZC or PZC-treated paper, paperboard, or a molded fibrous product is dried after addition of the AZC or PZC, which is typically done in an oven, platen dryer, by infra-red radiation, via hot air convection, by the use of steam cans, or any other drying means, as would generally be known to a skilled artisan.

In papermaking terms, these conditions approximate the conditions found coming off the couch roll, going through the wet press section of the paper machine, at the size press of the paper machine and coming out of the main section dryers (usually water boxes or calendar stack) which are the preferred application points, depending on the particular machine configuration (Handbook for Pulp and Paper Technologists, Smook & Kocurek, $4^{th}$ Ed, Tappi Press, 2016).

But a skilled artisan would readily understand that the embodiments are not necessarily limited to merely and specifically the mentioned zirconium salts. As such, in actuality, any zirconium salt that achieves the end-purpose of satisfactorily increasing the taber stiffness, abrasion resistance and strength of the paper can similarly be used for this purpose.

In certain particular embodiments, the treatment of the paper with Ammonium Zirconium Carbonate or Potassium Zirconium Carbonate results in the taber stiffness of the paper being improved by 8.5%, more preferably by at least 10%, even more preferably by 19.2% compared to an untreated control.

In certain particular embodiments, the Ammonium Zirconium Carbonate or Potassium Zirconium Carbonate treated paper may be compared a water-treated control.

In certain particular embodiments, the metal chelate may be applied by spraying, with a size-press, with a water-box, by padding, printing, foam application, roller application, impregnation on at least one surface of the fibrous product, or sprayed onto the paper machine wet web slurry and/or the dry sheet, where the taber stiffness and the abrasion resistance are selectively increased in one or more areas of the paper, and the metal chelate is sprayed selectively onto one or more areas of the dry sheet, where the paper strength needs to be increased.

In certain particular embodiments, the metal chelate treated fibrous product has an abrasion resistance that is about 7.8% to 21.3% higher compared to an otherwise similar untreated control, as measured by Taber abrasion resistance test TAPPI T 476 om-11.

In certain particular embodiments, the amount of the aqueous metal chelate solution applied on at least one surface of the fibrous product is in a range of about 0.05-2.0 lb solids/1000 square feet, preferably about 0.5-1.2 lb solids/1000 square feet, with the aqueous metal chelate solution having a metal chelate content of about 15% to about 20% based on weight of the metal chelate from the total weight of the aqueous solution.

In certain particular embodiments, the aqueous metal chelate solution is non-diluted, 1:1-diluted, 1:2-diluted with water, 1:3-diluted with water.

In certain particular embodiments of the paper-making-process, multiple webs are formed, and are thereby joined together, so before the wet webs are joined, the metal chelate is sprayed to at least one surface of a wet web being joined.

In certain particular embodiments of the paper-making-process, the fiber stock is formed into two or more wet fibrous webs, the wet webs being joined together obtaining a multilayered fibrous product, and the fibrous product is dried, where at least one of the surfaces of the wet fibrous webs being joined, is treated with the metal chelate.

In certain particular embodiments, a cellulosic fiber suspension of the wet end stock includes recycled fiber material, and/or virgin fiber material, virgin fiber, bleached, or unbleached fiber, recycled board, solid bleached sulfate (SBS), unbleached kraft board, bleached or unbleached recycled paper, or bleached paper, which recycled fiber material includes material originating from at least the following, but not limited, to old corrugated containers, cardboard, mixed office waste, double liner kraft, old newsprint, or any such mixtures thereof, and where the paper treated with the metal chelate solution is selected from the group, but not limited to, at least writing paper, printing paper, gypsum facing paper, single and multilayer paperboard, copy paper or molded fibrous product selected from egg carton, food service tray, beverage carrier, clamshell container, plate, bowl, or a mold for casting of concrete structures.

Certain particular embodiments are directed to methods for producing a fibrous product, preferably a gypsum board including a gypsum core, and where on both sides thereof, a facing paper with improved abrasion resistance and/or taber stiffness, paper, a paperboard or a molded fibrous product, with improved abrasion resistance and/or taber stiffness achieved, by the already aforementioned methods.

Certain embodiments are directed to the use of a metal chelate solution for improving abrasion resistance and/or taber stiffness of a fibrous product, where at least one surface of the fibrous product having a dryness of at least about 15% dry gram solid/total slurry weight, such as, about 15-65% gram solid/total slurry weight, or about 15%-35% gram solid/total slurry weight, or at least about 90% gram solid/total slurry weight, such as, about 90-98% gram solid/total slurry weight, is treated with the metal chelate solution which metal chelate solution, is characterized by having preferably the chemical compounds Ammonium Zirconium Carbonate (AZC) or Potassium Zirconium Carbonate (PZC).

In certain particular embodiments, the metal chelate may be selected from zirconium metal chelates, such as, ammonium zirconium carbonate, potassium zirconium carbonate, zirconium acetate, zirconium oxychloride, zirconium hydroxychloride, zirconium orthosulphate and zirconium propionate, preferably ammonium zirconium carbonate, and potassium zirconium carbonate.

Without being bound by any theory, metal chelates, such as, zirconium chelates, can react with hydroxyl, amine, carboxyl, carbonyl and/or aldehyde groups present on various material. Especially hydroxyl groups are abundant on the paper making fiber surfaces, but also carboxyl, carbonyl and/or aldehyde groups maybe present, and thereby metal chelates induce crosslinking and increased bonding between the fibers. Thus, the idea is that increased bonding between the fibers ultimately lead to improved taber stiffness, abrasion resistance. Zirconium chelates are economic for use, and easily available.

In certain particular embodiments, the metal chelate is added with a paper making machine. In certain embodiments, the metal chelate is added with a paper making machine used for drying and sizing.

In certain particular embodiments, the metal chelate is added with a spray on the sheet.

In certain particular embodiments, still further papermaking additives, such as, but not limited to, further strength agents and/or flocculants, as well as retention aids, drainage aids, biocides, defoamers, brightening agents, colorants, dyes, sizing agents, fixatives, coagulants, or any combinations thereof, may be added to the aqueous fiber stock, at any time before the headbox (10).

Definitions

Unless defined otherwise, all technical and scientific terms used herein have the same meaning as commonly understood by one of ordinary skill in the art to which this invention belongs. Although any materials similar or equivalent to those described herein can also be used in the practice of the present invention, exemplary materials are described for illustrative purposes.

As used herein, this disclosure, the terms, "paper process wet end stock" or "wet end stock" refer to thick stock or thin stock or both. The terms "paper process wet end stock", "wet end stock", "fiber stock" are used interchangeably herein this disclosure. The terms "paper machine wet web" and "wet web" are used interchangeably herein. Thick stock or thin stock may contain other chemical additives other than fiber and water.

As used herein this disclosure, taber "stiffness" can be measured by any known method known to a person having ordinary skill in the art, but preferably, by the TAPPI T 476 om-11 standard method.

As used herein this disclosure, by cellulosic fibers are meant any cellulosic or ligno-cellulosic fibers separated e.g. from wood, cotton, flax, hemp, jute, ramie, kenaf, abaca, or sisal, or fibers comprising regenerated cellulose such as, rayon, lyocell, viscose.

Typically, the cellulosic fiber suspension comprises pulp fibers obtained by chemical pulping such as, Kraft pulping or sulphite pulping, mechanical pulping, thermomechanical pulping, chemithermo-mechanical pulping, or organo-solvent pulping. The cellulosic fiber suspension may be comprised of bleached, unbleached or a blend of both types of cellulosic fibers. Cellulosic fiber may also originate as reclaimed or recycle fiber, that is, virgin fiber that has been processed through a use cycle (usually defined as industrial or consumer) and the fiber is now being contained for reclamation and reuse.

In certain embodiments the cellulosic fiber suspension includes virgin fibers, virgin fiber material, as bleached or unbleached fiber. In certain embodiments cellulosic fiber suspension includes recycled fiber material. In certain further amendments the recycled fiber material is selected from old corrugated containers, mixed office waste, double liner kraft, or any mixtures thereof. By old corrugated containers (OCC) is meant a material comprising corrugated containers having liners of test liner, jute or kraft, and it may cover also double sorted corrugated containers (DS OCC). By mixed office waste (MOW) is meant a material mainly containing xerographic papers and offset papers. By double lined kraft is meant a material comprising clean sorted unprinted corrugated cardboard cartons, boxes, sheet or trimmings, e.g. of kraft or jute liner. In addition to cellulosic fibers, the cellulosic fiber suspension may also include non-cellulosic polymeric fibers, such as, fibers of polyethylene, polypropylene, or polyester, in the form of e.g. single component or bi-component fibers.

In some embodiments the cellulosic fiber suspension may include at least 80 weight-%, at least 90 weight-%, or at least 95 weight-% of cellulosic fibers.

In some embodiments, inorganic fillers plus synthetic fibers may be included, however, the metal chelate solution does not affect the inorganic fillers and the synthetic fibers.

As used herein this disclosure, the term "paper" is understood to include a sheet material that contains cellulosic fibers, and which may also contain other materials. Suitable fiber materials to be used in the present process include natural and synthetic fibers, for example, cellulosic fibers obtained by chemical pulping, such as, kraft or sulfite pulping, semi-chemical pulping, or mechanical pulping, bleached or unbleached fibers; wood or non-wood fibers, fibers derived from recycled paper; synthetic fibers, waste activated sludge (WAS), reclaimed fiber sludge; softwood fibers (SW), hardwood fibers (HW) and any mixtures thereof. Products made of these fibers but are not formed into a sheet, but rather as a finished object (termed "molded fiber" or "molded pulp" products) included under the general heading "paper". Paperboard is a heavy grade of paper used mainly for packaging operations.

As used herein this disclosure, the terms fiber web and paper web are understood to include both forming and formed paper sheet materials. The term paper includes the following but without limitation, writing paper, printing paper, gypsum facing paper, single and multilayer paper and paperboard, and copy paper or the like. Terms paper, paperboard, paper product and paperboard product are used interchangeably herein.

As used herein and in the appended claims, the singular form "a," "and," "the" include plural referents unless the context clearly dictates otherwise.

As used herein, the terms "about" and "approximately" are used interchangeably, and have the meaning a person having ordinary skill in the art would readily understand.

The terms "comprises," "comprising," "includes," "including," "having" and their conjugates mean "including but not limited to." Terms and phrases used in this application, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. Adjectives such as, e.g., "conventional," "traditional," "known" and terms of similar meaning should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. The presence of broadening words and phrases such as, "one or more," "at least," "but not limited to," or other like phrases in some instances shall not be read to mean that the narrower case is intended or required in instances, wherein such broadening phrases may be absent.

It will be readily understood by one of ordinary skill in the relevant art that the present invention has broad utility and application. Although the present invention has been described and illustrated herein with referred to certain embodiments, it will be apparent to those of ordinary skill in the art that other embodiments may perform similar functions and/or achieve like results, and that the described embodiments are for illustrative purposes only. Thus, it should be understood that various features and aspects of the disclosed embodiments can be combined with, or substituted for one another in order to form varying modes of the disclosed invention. Many different embodiments such as, variations, adaptations, modifications, and equivalent arrangements are will be implicitly and explicitly disclosed by the embodiments described herein, and thus fall within the scope and spirit of the present invention.

Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method, product or use of the invention, and vice versa.

Further, the discussed prior art is not an admission by Applicant and should not be construed that the current invention does not antecede and is not patentable over the discussed prior art, but has merely been presented to better define the knowledge in the field to a skilled artisan and to the reader in general.

EXAMPLES

The following examples as well as the figures are included to demonstrate preferred embodiments of the invention. It should be appreciated by those of skill in the art that the techniques disclosed in the examples or figures represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1—Ammonium Zirconium Carbonate (AZC) Improves the Taber Stiffness and Abrasion Resistance of Paper Base Sheet While this method has application to all type of cellulosic fibers particularly those present in paper and paperboard (the presence of hydroxyl groups being the key factor), for this testing the paperboard grade called "white top liner" was chosen. This grade consists of an unbleached virgin fiber or recycle fiber layer comprising approximately 80% to 90% of the thickness of the finished sheet, with a discrete layer of bleached (white) cellulosic fiber comprising 10% to 20% of the final thickness of the sheet, applied to one side of the sheet as part of the papermaking process.

The reason for using this grade is that any abrasion of the bleached fiber layer will be readily visible, even to an untrained observer.

The paper samples to be tested were pre-conditioned for one day at 23° C. and 50% relative humidity. This follows the TAPPI T 402 om-93 Standard Conditioning and Testing Atmospheres for Paper, Board, Pulp, Handsheet, and Related Products method.

Application

The test spraying system is composed of a 1550 AutoJet Modular Spray System with a Phoenix I single axis servo controller. The spray application was targeted to apply 1 wet pound of liquid per 1000 ft² of paperboard. With this system, the maximum that could be applied was 0.88 wet lbs per 1000 ft² so that served as the default maximum for the testing.

AZC coat weight was varied by maintaining a constant application rate and diluting the AZC. In a field environment both options—dilution at a constant application rate or fixed dilution at a variable application rate may be used.

Application & Testing Conditions

Taber stiffness (resistance to bending) and Taber abrasion (how much material is removed by an abrader wheel) were run on a series of sample conditions to determine the change to these properties provided by the AZC.

The conditions tested were as follows:

Dry control—no additional surface treatment. This serves as the baseline value for comparison Water only—this allowed determination of the properties that were altered simply by the wetting of the sheet after it had been originally dried at 0.88 lbs per 1000 ft² (wet)

40% dilution AZC (as received AZC diluted 6 parts water to 4 parts AZC) at 0.82 lbs per 1000 ft² (wet)

60% dilution AZC (as received AZC diluted 4 parts water to 6 parts AZC) at 0.88 lbs per 1000 ft² (wet)

As received AZC (no dilution) at 0.88 lbs per 1000 ft²/MSF (wet)

Each test was run three times for Abrasion and four times for taber Stiffness with the values for each group of tests being averaged.

After the wet application, the samples were dried on a heat press at 240° F. for 60 seconds then allowed to recondition in the TAPPI room as described above.

Testing Results

Taber Abrasion—Two sets of tests were run. One at 50 cycles and a more aggressive one at 200 cycles. Testing was done at an instrument loading pressure of 500 g and using the green "Calibrase CS-10" Taber wheels. TAPPI Test Method T-476 om-11 was used for this process.

At 50 cycles, the average of 3 tests for each condition yielded the following differences in Taber abrasion under the conditions described above (Table 1):

TABLE 1

| 50 cycle Taber Abrasion results | |
|---|---|
| Condition at 50 cycles, average three tests | % Improvement in Taber Abrasion |
| Untreated sample | 0% (baseline) |
| Water spray | +2.7% |
| 40% AZC solution | +12.6% |
| 60% AZC solution | +8.1% |
| 100% AZC solution | +21.3% |

Subjecting the samples to a more aggressive 200 cycle test (Table 2):

TABLE 2

| 200 cycle Taber Abrasion results | |
|---|---|
| Condition at 200 cycles, average three tests | % Improvement in Taber Abrasion |
| Untreated sample | 0% (baseline) |
| Water spray | −4.0% |
| 40% AZC solution | +9.6% |
| 60% AZC solution | +7.8% |
| 100% AZC solution | +18.8% |

For abrasion, any improvement above 5% from baseline (no treatment) is considered significant.

Figure 2A:
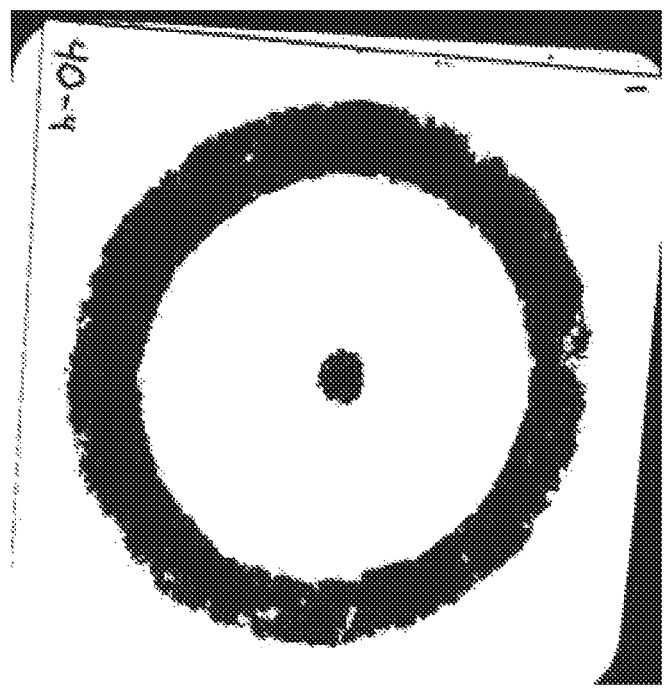
FIGS. 2A-2C show the taber abrasion visually.
Figure 2B:
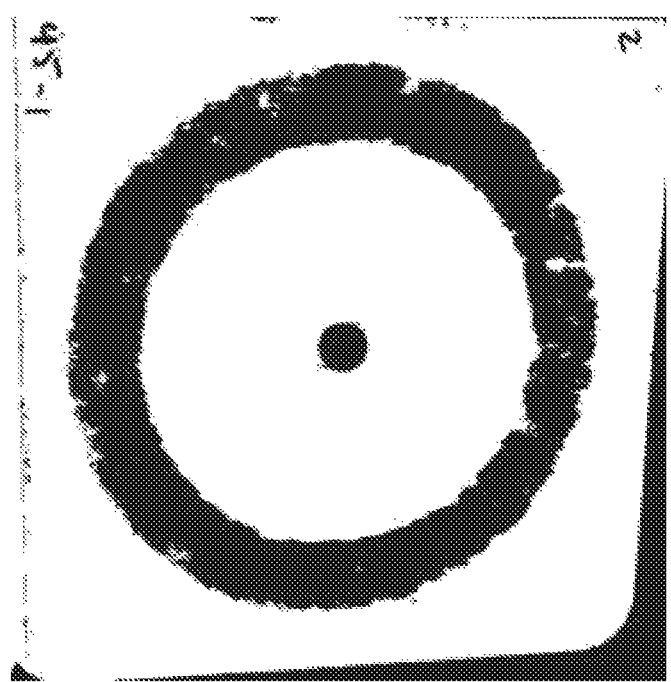

Regarding the taber Abrasion, visually, the improved abrasion resistance is apparent. The Figures show: FIG. 2A: No treatment; FIG. 2B: Water only; and FIG. 2C: AZC (100%). With no treatment, it is noted that the white layer has been abraded off, allowing the brown layer to show through. Qualitatively, the more white fiber remaining, the better the abrasion resistance.

FIG. 2B. 200 cycles, water treatment.

Figure 2C:
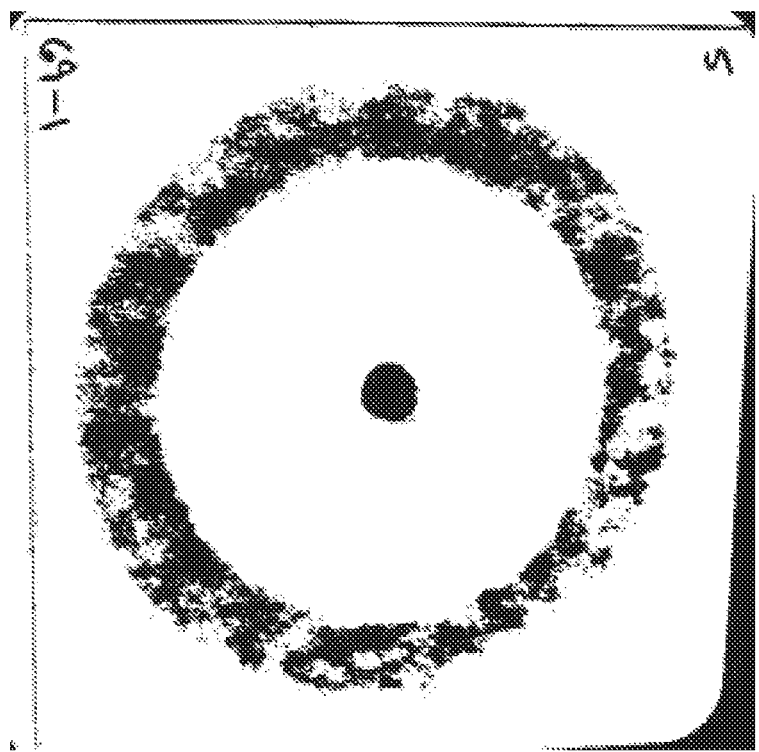

FIG. 2C. 200 cycles, AZC, 0.88 wet lbs/1000 ft² at 100%. It is clearly noted that there is a less abraded white fiber layer.

Taber Stiffness

The bending resistance of paper is determined by measuring the force required to bend a specimen under controlled conditions. The bending moment in gram centimeters necessary to deflect the free end of a 38 mm (1.5 inch wide) vertically clamped specimen 15° from its center line when the load is applied 50 mm away from the clamp is measured. This test follows TAPPI Test Method T 489 om-08. Four measurements were taken on both Cross Direction (CD) and Machine Direction (MD) direction per condition. A TMI Taber Model 150-D was used for this work.

Figure 3:
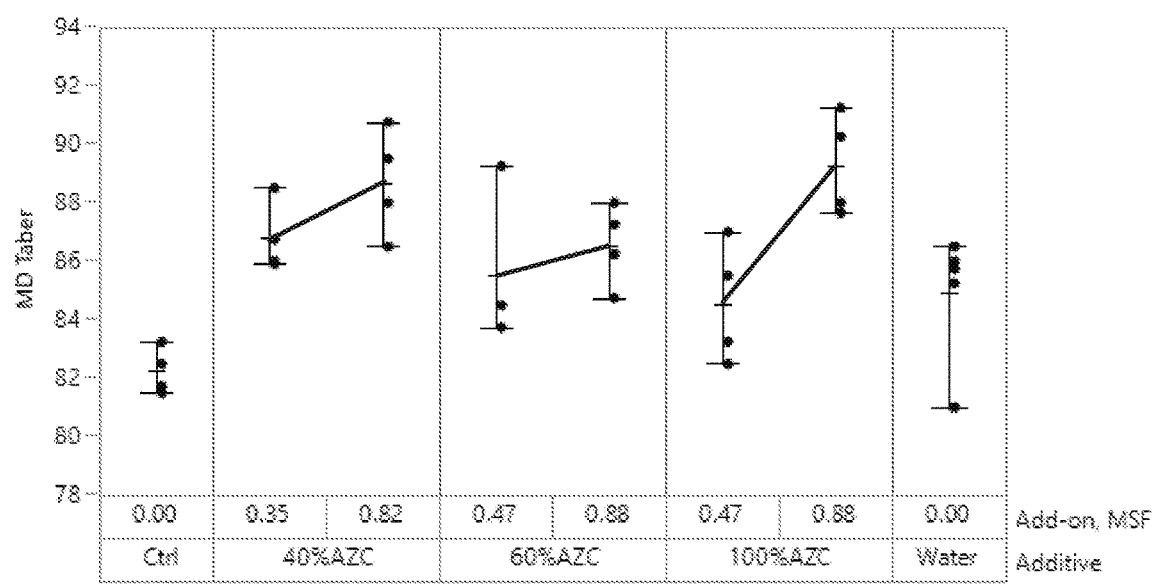
FIG. 3 shows the results of the taber stiffness experiments.

FIG. 3 shows the results for the testing done in the machine direction (MD) (with the grain of the paper sheet). Paper and paperboard are generally stiffer (more resistant to bending) in the machine direction because of the way the fibers are oriented in the sheet. Therefore, tests of this kind are carried out in the two primary orientations—with the grain (Machine Direction or MD) and across the grain (Cross Direction or CD).

The black dots indicate the individual test results. The Control (Ctrl) as expected had the tightest data grouping. The row labeled "add on" is the applied coat weight in wet lbs per 1000 ft² of paperboard.

In all cases (qualitatively) an increase in the applied AZC coat weight resulted in an increase (improvement) in the taber stiffness. All of the AZC treated samples exceeded the taber stiffness of the untreated control, with the higher application levels of AZC also exceeding the water-only condition, leading to the conclusion that the AZC does contribute to the taber stiffness of the sheet.

Figure 4:
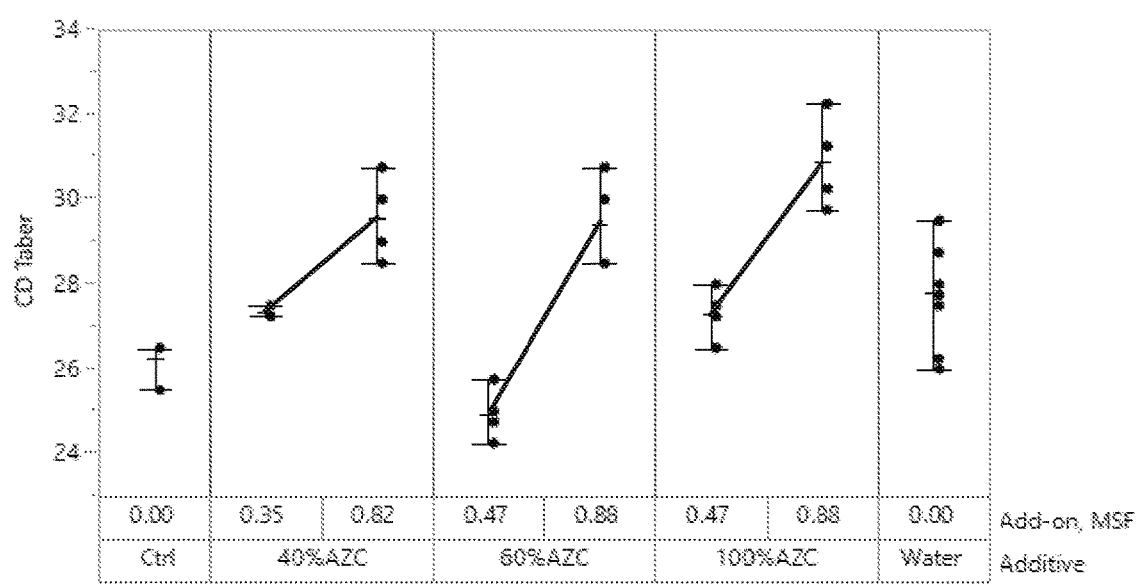
FIG. 4 shows the results of the CD testing experiments.

FIG. 4 shows the CD testing, and there is seen more variability, but at the higher applied coat weights, there is still improvement over the water-only condition.

Comparing the Key Conditions

For the MD condition, the 0.88 wet lb per 1000 ft$^2$ application improved taber stiffness by 8.5% compared to the untreated control and improved taber stiffness by 4.7% compared to the water-only application.

For the CD condition, the 0.88 wet lb per 1000 ft$^2$ application improved taber stiffness by 19.2% compared to the untreated control and improved taber stiffness by 12.7% compared to the water-only application.

The proposed mechanism is that the higher fiber to fiber bonding provided by the AZC treatment reduces the stretching and slippage of the fibers within the sheet, giving a higher taber stiffness.

What is claimed is:

1. A method for improving resistance to bending of a multilayered fibrous product, the method comprising:
   providing an aqueous fiber stock,
   forming the fiber stock into two or more wet fibrous webs, wherein the wet fibrous webs are joined together to obtain a wet multilayered fibrous product; and
   drying the wet multilayered fibrous product such that
   at least one surface of the wet fibrous webs has a solids content of 15-65 weight-%; and treating the at least one surface of the wet fibrous webs being joined with an aqueous zirconium chelate solution, by applying the aqueous zirconium chelate solution on the surface in amount of 0.05-2 lb solids/1000 square feet, wherein the treatment is conducted between the layers to be joined to thereby enhance a fiber to fibre bonding at the at least one surface through forming bonds with —OH groups on fibres.

2. The method according to claim 1, wherein the method increases an abrasion resistance of the product about 7.8% to 21.3% as compared to an otherwise similar untreated control, when measured by Taber abrasion resistance test TAPPI 476 om-11.

3. The method according to claim 1, wherein the fibrous product is a paper or paperboard, and the at least one surface comprises at least one side of the paper or the paperboard.

4. The method according to claim 3, wherein the at least one surface comprises two sides of the paper or the paperboard.

5. The method according to claim 1, wherein the aqueous zirconium chelate solution comprises ammonium zirconium carbonate (AZC) and/or potassium zirconium carbonate (PZC).

6. The method according to claim 1, wherein the at least one surface is treated with the aqueous zirconium chelate solution by applying the solution by spraying, with a size-press, with a water-box, by padding, printing, foam application, roller application, or impregnation.

7. The method according to claim 1, wherein the aqueous zirconium chelate solution has a zirconium chelate content of about 15% to about 20% based on weight of the zirconium chelate from the total weight of the aqueous solution.

8. The method according to claim 1, wherein the fiber stock comprises recycled fibers, bleached fibers, unbleached fibers, and/or virgin fibers.

9. The method according to claim 8, wherein the recycled fibers originate from corrugated containers, cardboard, double liner kraft, and/or newsprint.

10. The method according to claim 1, wherein the aqueous zirconium chelate solution is applied on the at least one surface of the fibrous product in an amount of 0.5-1.2 lb solids/1000 square feet.

11. The method according to claim 1, wherein the at least one surface of the wet fibrous webs has a solids content of 15-25 weight-%.

* * * * *